June 21, 1938.  J. P. FREED  2,121,482
FLUID FLOW CONTROL AND SILENCER
Filed Aug. 22, 1935
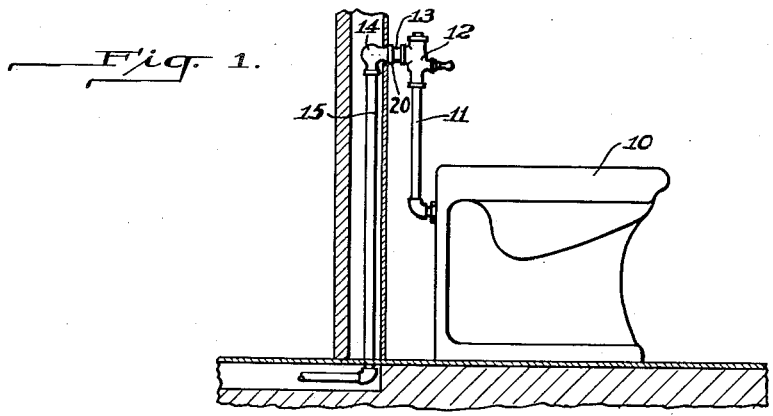
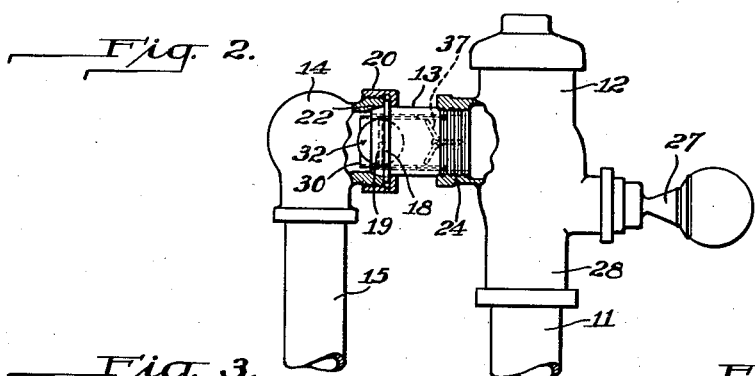
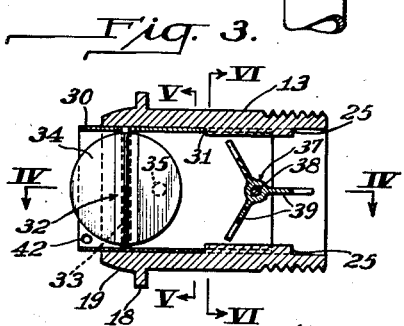
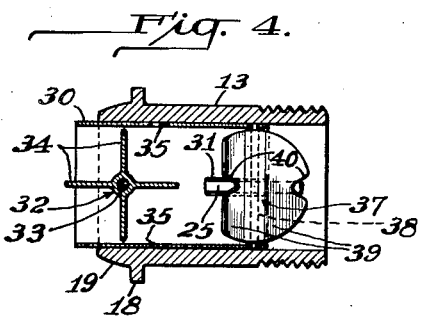
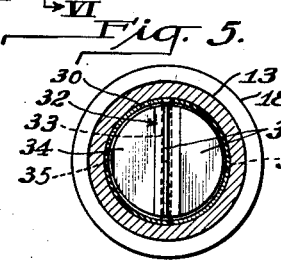
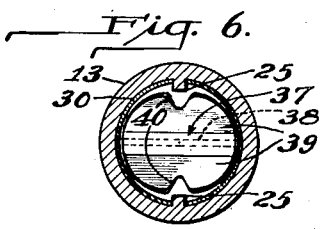
WITNESSES
A. B. Wallace.
A. H. Oldham.
INVENTOR.
Joseph P. Freed
BY Brown, Critchlow & Flick
ATTORNEY.

Patented June 21, 1938

2,121,482

UNITED STATES PATENT OFFICE 2,121,482

FLUID FLOW CONTROL AND SILENCER

Joseph P. Freed, Los Angeles, Calif., assignor to
Edith F. Freed, Los Angeles, Calif.

Application August 22, 1935, Serial No. 37,371

4 Claims. (Cl. 181—64)

This invention relates to mechanism for controlling and silencing fluid flow and more particularly is concerned with apparatus for the saving of water and the elimination of noise in the operation of lavatory fixtures.

In the flow of fluid, such as water, through conduits, pipes and the like high pressure, sharp turns and sudden stopping of the fluid flow have all resulted in objectionable noises in the conduits which is well exemplified by the thump resulting when a water faucet is suddenly shut. Heretofore some devices have been suggested for reducing the noise attending fluid flow and, for example, sieves and other filter-like mechanisms have been used in pipes to somewhat reduce the noise of fluid flow. Filter mechanisms, however, have been found to materially cut down the amount of fluid flow which is often objectionable. Likewise the sieve and filter pipe silencers clog up very quickly in use and without exception need be taken out and cleaned or replaced usually within several months of their installation. An improvement upon these formerly known types of silencers is described and claimed in my Patent No. 2,028,123, issued January 14, 1936. The present invention constitutes a further improvement in silencers and avoids and eliminates the objectionable features of prior devices as set forth above.

While the present invention is broadly applicable to reducing the noise attending fluid flow through pipes wherever used, it is particularly suited for use with lavatory fixtures wherein water under relatively high pressures is employed. Since the water is under such pressure as, for example, to force it to the top of floors of a high building naturally in the operation of the fixtures the high-water pressure causes very considerable noise and furthermore results in the use of more than the necessary quantity of water. As a matter of fact, the very high pressure employed in known water closet installations will sometimes cause a back pressure in the discharge pipes of the closet so that proper flushing action is not always obtained.

Prior to my invention some apparatuses have been provided for reducing the noise attending the operation of lavatory fixtures. However, these devices have been either too expensive and complicated to meet with public acceptance or they have been unsatisfactory for the reason that they soon clog up and prevent proper or sufficient water flow. Again they have not proven entirely satisfactory in reducing the noise attending the use of the lavatory.

It is a general object of my invention to avoid and overcome the foregoing and other objections to the use of prior devices for silencing and controlling fluid flow by the provision of a mechanism which materially reduces fluid flow noise and simultaneously controls the amount of fluid flow.

Another object of the invention is to provide a silencing and flow-controlling apparatus to be connected between a flush valve and a source of fluid supply to thereby substantially eliminate the noise normally created when the fluid from the supply line passes through the valve when it is opened.

Another object of the invention is to provide a silencing and water saving mechanism upon pressure-type lavatory fixtures.

Another object of the invention is to provide a control and silencer for fluid flow which is relatively simple and inexpensive and which operates positively and over long periods without repair or cleaning.

Another object of the invention is to provide a unit for silencing and reducing the flow of water to a pressure-type water closet with the unit being adapted to be placed by the layman with ease in the fluid supply line without alteration of any structure.

The foregoing and other objects of the invention are achieved by providing mechanism which includes one or more rotatable members positioned in the path of fluid flow and having vanes or blades contacting with the fluid and rotating the members during fluid flow. The rotatable members, preferably with axes at an angle to each other, are generally mounted in a tube which may be slid into and retained in the conduit carrying the fluid.

In the accompanying drawing, Fig. 1 is a side elevation of a pressure-type water closet incorporating the water saving and silencing unit of the present invention; Fig. 2 is a side elevation on a larger scale of a portion of Fig. 1 and illustrates one embodiment of the silencing and controlling unit of the present invention; Fig. 3 is a longitudinal cross-sectional view through the water saving and silencing unit shown in Fig. 2; Fig. 4 is a longitudinal cross-sectional view taken on line IV—IV of Fig. 3; Fig. 5 is a diametrical cross-sectional view taken on line V—V of Fig. 3; Fig. 6 is a diametrical cross-sectional view taken on line VI—VI of Fig. 3.

While the water saving and silencing mechanism of the present invention is broadly applicable for use in many relations, it is particularly beneficial for use with lavatory fixtures, such as water closets. Accordingly, the invention has been illustrated in the drawing in connection with a pressure water closet and will so be described here.

Having reference to Figs. 1 and 2 of the drawing, the numeral 10 indicates a pressure-type water closet of any known design which is connected by a pipe 11, a flush valve 12, a coupling 13 and an L 14 to a fluid pressure supply conduit 15.

The fluid supply conduit 15 is generally embedded in a wall 16, as shown, with the L 14 extending therethrough so that the coupling 13 can be secured to the L. The coupling 13 is generally formed with a flange 18, a curved seat 19 and a nut 20 so that tightening the nut 20 on the L 14 causes the nut to engage with the flange 18 to clamp the curved seat 19 of the coupling 13 into sealing contact with a curved seat 22 formed on the L.

The other end of the coupling 13 is threaded in accordance with the usual practice and is screwed into the internally threaded inlet port 24 of the flush valve 12. In order to prevent scoring of the coupling 13 which is often finished in chromium, nickel, or the like, the coupling 13 is provided with lugs 25 which are engaged by a suitable wrench or tool to screw the end of the coupling into the inlet port 24 of the flush valve 12.

The flush valve 12 is of a standard or conventional type such as shown, for instance, in Miller Patent No. 1,845,055; hence it will not be described in detail. Briefly it includes an operating handle 27 and an outlet port 28 connected to the pipe 11 with the valve operating to open for a given time interval upon operation of the handle 27 and to then automatically close at the end of this interval.

The water saving and silencing unit of the present invention is adapted to be inserted in the connections above described without special tools and without modification of this structure. It has been determined that one of the best places to put the silencing unit is immediately before the flush valve 12 and the coupling 13 is particularly adapted to receive a unit. In equipping the system with a unit of the present invention the coupling 13 is taken off from the L 14 by unscrewing nut 20 and the unit is inserted and the coupling is screwed back together again. The entire operation can be done in a minute or two. Thus, as shown in Figures 2 to 6 the coupling 13, without modification, receives the unit of the present invention which includes a tube 30 having slots 31 cut at one end which are adapted to receive the lugs 25 formed on the coupling 13. The tube 30 thus has a relatively close sliding fit in the inside of the coupling 13 so that the fluid flowing through the coupling passes substantially entirely through the tube 30.

Pivotally mounted in the tube 30, usually near one end, is a vaned paddle-wheel baffle member, shown generally at 32, which is pivotally carried by a pin 33 held at its ends by the tube 30. The paddle-wheel baffle member 32 has a plurality of semi-circular vanes or blades 34, preferably four in number, which just clear the sides of the tube 30 so that during the flow of fluid through the tube 30 and coupling 13 the paddle-wheel member revolves on its axis about pin 33. The vanes 34 may be made slightly curved perpendicular to their axis or they may be set slightly off center to insure that the member rotates properly. The tube 30 is provided with holes 35 at diametrically opposite points preferably at right angles to the pin 33 and these holes 35 permit the escape of entrapped air or fluid so that the paddle-wheel member 32 is free to revolve during fluid flow. Although the drawing conveniently illustrates the tube 30 in abutting relation with the coupling 13 in actual practice there is a slight clearance between the parts such as to allow the holes 35 to function as described. A second rotatable baffle member 37, similar to member 32, is also provided in the unit and the member is pivotally carried by a pin 38 which is secured at its ends in the tube 30 so that the pins 38 and 33 are at an angle to each other and this angle is preferably a right angle. The rotatable baffle member 37 can be made with any number of vanes or blades but preferably is formed with three blades 39 which are notched as at 40 to pass over the lugs 25.

The tube 30 can be formed with means which facilitate its removal from the coupling 13 if this be desired and, in the particular embodiment of the invention illustrated, a hole 42 is formed at one end of the tube which permits the hooking of a pull-out tool in the tube 30 to thereby facilitate removal of the unit from the coupling 13.

It is believed that the operation of the mechanism will be understood from the foregoing description and that in operation the water saving and silencing unit of the present invention functions to substantially eliminate the noise of the fluid flow in the water closet system and at the same time to regulate the amount of fluid flow whereby the best operation of the closet is assured. The fluid flow, of course, turns the rotatable members 32 and 37 and they thereby act to cushion the flow to prevent surging, thumping and other noise in the pipes and conduits. As to the flow-controlling and water saving operation of the unit, it has been found that the unit saves at least fifty per cent, and sometimes even greater amounts, of water in the operation of a closet, while at the same time insuring a very good flushing operation without back pressure. By determining the clearance between the rotatable members 32 and 37 and the tube 30 and by determining the number of vanes on the members the desired flow controlling action best suited for any particular type of lavatory can be obtained. More vanes and less clearance cuts down the fluid flow. Preferably the rotatable member first engaging with the fluid during flow has greater resistance to that flow than any other member.

The parts of the silencing unit are preferably made from corrosion-resisting materials, such as brass, stainless steel, aluminum, copper or the like, and the invention also contemplates the use of non-metallic materials, such as bakelite, porcelain, glass, rubber, or other moldable plastics.

It will be seen that the objects of the invention have been achieved and that a controlling and silencing unit for fluid flow has been provided which can be readily inserted in a pipe system without special tools or skilled labor. The unit is non-clogging and operates over extended periods without inspection, repair or replacement. By changing the clearance of the parts, the particular type of controlled flow desired is obtained and at the same time the unit operates to materially reduce and eliminate the noise attending the fluid flow.

The invention contemplates employing rotatable members with any number of blades or vanes with the axes of the members being positioned at various angles to each other. The particular number of rotatable members is dependent upon the noise reduction and the metering flow desired. However, broadly the invention teaches the use of one or more rotatable members.

In accordance with the patent statutes, one embodiment of the invention has been illustrated and described in detail. However, it will be understood that the invention is not limited thereto or thereby but is defined by the appended claims.

I claim:

1. A silencing and flow control unit for use in the conduit adjacent the flush valve of a water closet, said unit including a tube having a sliding fit in the conduit, a four-vaned paddle-wheel baffle pivotally mounted in the tube adjacent one end thereof, the tube being provided with holes near the diameter perpendicular to and bisecting the axis of the baffle, and a three-vaned paddle-wheel baffle pivotally mounted in the tube on an axis substantially at right angles to the four-vaned baffle.

2. A silencer for use in the conduit leading to a water-closet bowl, said silencer including a tube having a sliding fit in the conduit, a paddle-wheel baffle pivotally mounted in the tube adjacent one end thereof, the tube being provided with holes near the diameter perpendicular to and bisecting the axis of the baffle, and a second paddle-wheel baffle pivotally mounted in the tube on an axis substantially at right angles to the first baffle.

3. A flow control and silencer for use with a conduit extending to a pressure-type lavatory, said unit including a paddle-wheel baffle pivotally mounted in the tube adjacent one end thereof, and a second paddle-wheel baffle pivotally mounted in the tube on an axis on an angle to the first-named baffle.

4. That combination recited in claim 2 wherein further the rotatable baffle first contacting with the fluid is formed with greater area to have more resistance to fluid flow than the other rotatable baffle.

JOSEPH P. FREED.